(12) United States Patent
Tao et al.

(10) Patent No.: US 11,028,504 B2
(45) Date of Patent: Jun. 8, 2021

(54) MULTI-LEVEL-ARCHITECTURE MULTIFIBER COMPOSITE YARN

(71) Applicant: The Hong Kong Polytechnic University, Kowloon (HK)

(72) Inventors: Xiaoming Tao, Kowloon (HK); Ziheng Zhang, Kowloon (HK)

(73) Assignee: The Hong Kong Polytechnic University, Kowloon (HK)

( * ) Notice: Subject to any disclaimer, the term of this patent is extended or adjusted under 35 U.S.C. 154(b) by 479 days.

(21) Appl. No.: 15/953,858

(22) Filed: Apr. 16, 2018

(65) Prior Publication Data

US 2019/0316277 A1 Oct. 17, 2019

(51) Int. Cl.
*D02G 3/38* (2006.01)
*D02G 3/40* (2006.01)
*D02G 3/04* (2006.01)

(52) U.S. Cl.
CPC ............ *D02G 3/404* (2013.01); *D02G 3/045* (2013.01); *D02G 3/38* (2013.01); *D10B 2331/02* (2013.01); *D10B 2331/30* (2013.01)

(58) Field of Classification Search
CPC .......... D02G 3/404; D02G 3/38; D02G 3/045; D10B 2331/02
See application file for complete search history.

(56) References Cited

U.S. PATENT DOCUMENTS

| | | | | |
|---|---|---|---|---|
| 8,898,821 | B2* | 12/2014 | Stanhope | D02G 3/443 2/458 |
| 2008/0170982 | A1* | 7/2008 | Zhang | G01L 1/2287 423/447.3 |
| 2020/0088174 | A1* | 3/2020 | Tawfick | A61F 2/00 |

\* cited by examiner

*Primary Examiner* — Tajash D Patel
(74) *Attorney, Agent, or Firm* — Renner, Kenner, Greive, Bobak, Tayler & Weber

(57) ABSTRACT

A multi-level-architecture multi-fiber composite yarn includes a composite yarn having a first anisotropic expansion coefficient in an axial and/or radial direction, and a matrix material included with the yarn, wherein the matrix material has a second anisotropic expansion coefficient that is different from the first anisotropic expansion coefficient in at least one of the axial or radial directions. A method of fabricating a multi-level-architecture multi-fiber composite yarn includes infiltrating a composite yarn having a first anisotropic expansion coefficient in an axial and/or radial directions with a matrix material having a second anisotropic expansion coefficient different from the first anisotropic expansion coefficient in the axial or radial direction.

23 Claims, 3 Drawing Sheets

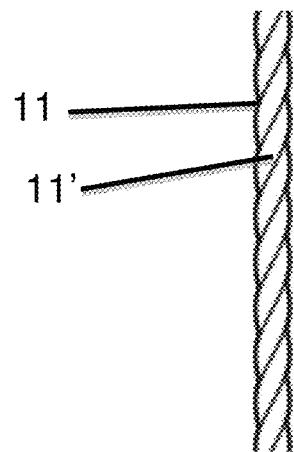
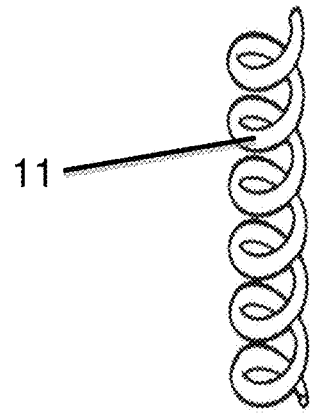
FIGURE 3  FIGURE 4
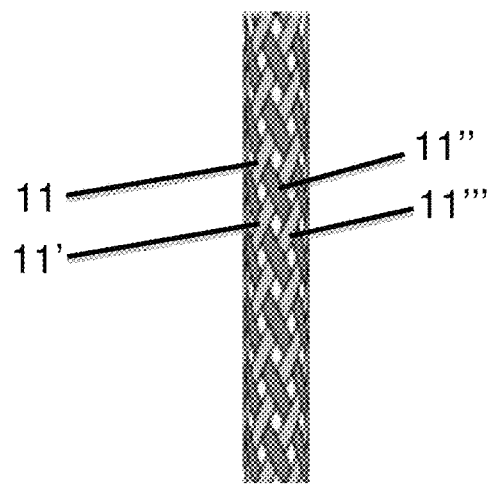
FIGURE 5

MULTI-LEVEL-ARCHITECTURE MULTIFIBER COMPOSITE YARN

FIELD OF THE INVENTION

The present invention relates to composite yarns, and more particularly to a multi-level-architecture multi-fiber composite yarn that is deformable in an axial and/or radial direction by external stimulation. The present invention also relates to artificial muscles (e.g. actuators) that find application in, for example but not limited to, intelligent robots and prosthetic limbs.

BACKGROUND TO THE INVENTION

Artificial muscles have are a significant field of research owning to their wide application, such as in intelligent robots, prosthetic limbs for medical care, deformable textiles and energy harvest etc. WO9727822A1 discloses such a muscle cell which comprises a coiled electromagnetic actuator and an elastomeric substrate. The principle of this type of artificial muscle lies on the contraction resulting from electromagnetic attraction between the turns of the coil. Chinese publication CN1413562A goes on to disclose an artificial muscle utilizing magnetic rheopectic (MR) liquid, in which deformation is driven by the magnetic polarization of the MR liquid and resultant deformation. This achieves a high contraction force and lighter weight. Another publication, WO2015017898A discloses a different approach of a bionic muscle made by a series of electromagnet coils and power circuits.

In recent years, thermally powered artificial muscles have aroused more attentions. In 2012, Lima, Li et al reported an artificial muscle made by guest-infiltrated carbon nanotube yarn the can be actuated by thermal, electro-thermal, photothermal and chemical power. The guests include paraffin wax, polyethylene glycol etc. See Lima M D, Li N, Jung de Andrade M, Fang S, Oh J, Spinks G M, Kozlov M E, Haines C S, Suh D, Foroughi J, Kim S J, Chen Y, Ware T, Shin M K, Machado L D, Fonseca A F, Madden J D, Voit W E, Galvao D S, Baughman R H. Electrically, chemically, and photonically powered torsional and tensile actuation of hybrid carbon nanotube yarn muscles. Science. 2012; 338 (6109):928-932.

Then Haines, Li et al presented a low-cost thermally or electro-thermally powered muscles in 2014, with nylon fishing line and sewing thread as the raw materials. See Haines C S, Lima M D, Li N, Spinks G M, Foroughi J, Madden J D W, Kim S H, Fang S, Andrade M Jd, Göktepe F, Göktepe Ö, Mirvakili S M, Naficy S, Lepró X, Oh J, Kozlov M E, Kim S J, Xu X, Swedlove B J, Wallace G G, Baughman R H. Artificial Muscles from Fishing Line and Sewing Thread. Science. 2014; 343(6173):868-872 and Li N, Haines C S, Lima M D, Jung de Andrade M, Fang S, Oh J, Kozlov M E, Goktepe F, Goktepe O, Suh D, Baughman R H. Coiled and non-coiled twisted nanofiber yarn and polymer fiber torsional and tensile actuators. WO2014022667 (A2), 2014 Feb. 6. In 2015, Yip and Niemeyer reported on artificial muscles made from super-coiled conductive nylon sewing thread, which offered strong mechanical power and were applied to the grab of robotic hand. See Yip M C, Niemeyer G. High-Performance Robotic Muscles from Conductive Nylon Sewing Thread. 2015 IEEE International Conference on Robotics and Automation; Washington State Convention Center. 2015:2313-2318.

Melvinsson also fabricated pure poly(vinylidienefluoride) (PVDF)-based coiled artificial muscle, finding that a higher degree of crystallinity and molecular weight of the material facilitated better properties. Melvinsson R. Textile actuator fibers. Sweden: University of Boras; 2015.

In 2016, Hiraoka et al proposed a new coiled fiber actuator made by linear-low density polyethylene (LLDPE), which can be driven in low temperature and in favour of the use in wearable systems. See Hiraoka M, Nakamura K, Arase H, Kaneko Y, Tagashira K, Omote A. Power Efficient Low Temperature Woven Coiled Fiber Actuator for Wearable Devices. 2016 MRS Spring Meeting and Exhibition; Mar. 29; Phoenix, Ariz. 2016.

In 2017, Wu et al designed and fabricated a compact, low-cost and lightweight 3D printed humanoid hand which is actuated by twisted and coiled conductive sewing thread (nylon 6,6 precursor), thus realizing the grasping function similar to natural hand. See Wu L, Jung de Andrade M, Saharan L K, Rome R S, Baughman R H, Tadesse Y. Compact and low-cost humanoid hand powered by nylon artificial muscles. Bioinspir Biomim. 2017; 12(2):026004. Park et al developed a twisted-coiled polymer fiber actuator by surface-modified (silver-plating) polyethylene terephthalate (PET) yarn, providing a potential for the use in artificial muscle. See Park J, Yoo J W, Seo H W, Lee Y, Suhr J, Moon H, et al. Electrically controllable twisted-coiled artificial muscle actuators using surface-modified polyester fibers. SmMaS, 2017; 26(3):035048.

SUMMARY OF THE INVENTION

According to a first aspect if the invention there is provided a multi-level-architecture multi-fiber composite yarn, comprising a composite yarn having a first anisotropic expansion coefficient in an axial and/or radial direction, and a matrix material included with the yarn, wherein the matrix material which has a second anisotropic expansion coefficient that is different from the first anisotropic expansion coefficient in at least one of the axial or radial directions.

Preferably, the composite yarn comprises multiple continuous filament or staple fibers combined to form a single yarn.

Preferably, the fibers comprise synthetic or natural fibers twisted to form the single yarn.

Preferably, the fibers are selected from a group comprising polyimide, polyester, polyethylene, polyamide, aliphatic polyesters, polylactic acid, poly(3-hydroxybutyrate-co-3-hydroxyvalerate), metal, ceramic or wool.

Preferably, the multiple continuous filament or staple fibers are coated with one or more mechanical or environmental protective layers.

Preferably, one of the mechanical or environmental protective layers is a biocompatible component such as silicone.

Preferably, the composite yarn comprises two more single composite yarns included together by one of twisting, winding, plying, cabling or braiding.

Preferably, the matrix material is selected from a group comprising. poly(dimethylsiloxane), dimethicone, thermal plastic elastomeric olefin, polyurethane, ethoxyline, natural or synthetic rubber, mineral, responsive gel.

Preferably, the expansion coefficient(s) is(are) one that is responsive to hydrothermal, electro-thermal, photo-thermal, hygral, chemical stimulation.

According to a first aspect if the invention there is provided a method of fabricating a multi-level-architecture multi-fiber composite yarn, comprising infiltrating a composite yarn having a first anisotropic expansion coefficient in an axial and/or radial directions with a matrix material having a second anisotropic expansion coefficient different from the first anisotropic expansion coefficient in the axial or radial direction.

Preferably, wherein the composite yarn is firstly prepared by combining multiple continuous filament or staple fibers into a single yarn.

Preferably, the method further comprises selecting the fibers from a group comprising polyimide, polyester, polyethylene, polyamide, aliphatic polyesters, polylactic acid, poly(3-hydroxybutyrate-co-3-hydroxyvalerate), metal, ceramic or wool.

Preferably, the continuous filament or staple fibers are firstly prepared by applying one or more mechanical or environmentally protective layers to the fibers.

Preferably, the method further comprises twisting the multiple fibers into a single yarn and then coiling the single yarn against a tool by either further twisting (homochirality) or heat setting prior to twisting in the opposite direction (heterochirality), or winding against a tool.

Preferably, the method further comprises plying or cabling or braiding the matrix infiltrated composite yarn.

Further aspects if the invention will become apparent from the following description and accompanying drawings which is given by way of example only.

BRIEF DESCRIPTION OF THE DRAWINGS

The invention will now be described with reference to the accompanying drawings in which:

FIG. 3 is an illustration a twisted bundle of the filaments or fibers, FIG. 4 is an illustration a twisted and coiled bundle of filaments or fibers, FIG. 5 is an illustration of a braiding a composite yarn.

DESCRIPTION OF THE PREFERRED EMBODIMENTS

Preferred embodiments of the invention will now be described to illustrate the invention. The terminology used is for illustrative purposes only and is not intended to limit the scope and/or use of the invention unless the context clearly requires otherwise.

Figure 1:
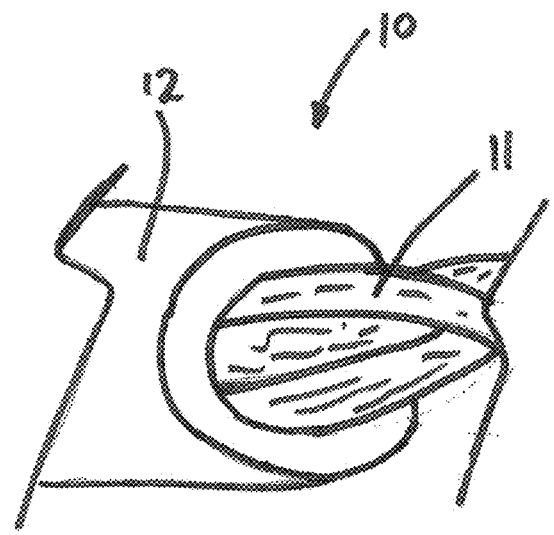
FIG. 1 is a cut-away section illustration of a multi-fiber composite yarn according to the invention.

FIG. 1 shows an exemplary of a multi-level-architecture multi-fiber composite yarn (MAMFCY) 10 having one or more, preferable multiple, composite yarns 11 included within a matrix material 12. The coated composite yarns 11 are each made by twisting or grouping multiple long continuous filament fibers, or by spinning and or twisting staple fibers together to make a cohesive single thread. In the preferred embodiment of the invention, two or more individual composite yarns are used and are combined by twisting, cabling (i.e. twisting together in the opposite direction to their individual twist direction), interlacing three or more strands in a braid, or other such techniques of combinations thereof as known in the art. The composite yarns 11 are each made from synthetic or natural fibers such as polyimide, polyester, polyethylene, polyamide, aliphatic polyesters like polylactic acid or poly(3-hydroxybutyrate-co-3-hydroxyvalerate), metal, ceramic or wool. The material of the composite yarns is chosen to give the yarns a first anisotropic expansion coefficient in an axial and/or radial direction.

The matrix material may be made from materials such as poly(dimethylsiloxane), dimethicone, thermal plastic elastomeric olefin, polyurethane, ethoxyline, natural or synthetic rubber, mineral or responsive gel. The material of the matrix material is chosen to give the matrix a second anisotropic expansion coefficient that is different from the first anisotropic expansion coefficient in at least one of the axial or radial directions.

Figure 2:
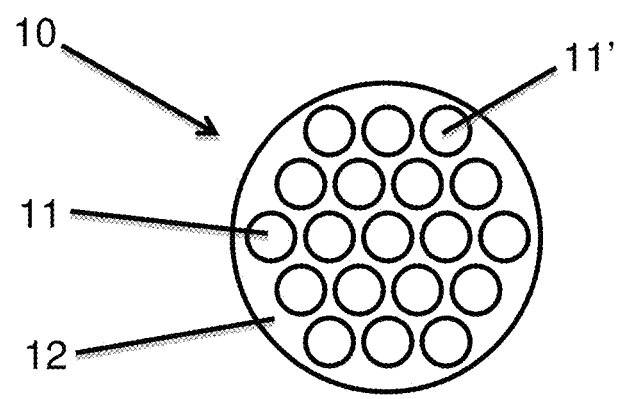
FIG. 2 is a cross-section illustration of the multi-fiber composite yarn.

In a preferred embodiment of the invention the yarns 11 comprise polyamide and the encasing matrix material 12 is poly(dimethylsiloxane). As shown in FIG. 2, a plurality of yarns 11, 11' etc. are dispersed evenly within the matrix material 12. The expansion coefficient of polyimide is $1.88 \times 10^{-6} K^{-1}$ ($1.88 \times 10^{-6} K^{-1}$) in the axial direction and $845 \times 10^{-6} K^{-1}$ ($845 \times 10^{-6} K^{-1}$) in the radial direction at 50-230 deg-C. In contrast the expansion coefficient of poly(dimethylsiloxane) in all directions is about $600 \times 10^{-6} K^{-1}$ ($600 \times 10^{-6} K^{-1}$) at 50-230 deg-C. Accordingly, when the MAMFCY is subjected to a temperature change the polyimide yarn exhibits greater stability in the axial direction than the poly(dimethylsiloxane) matrix resulting in an actuating stroke of the MAMFCY.

Figure 6:
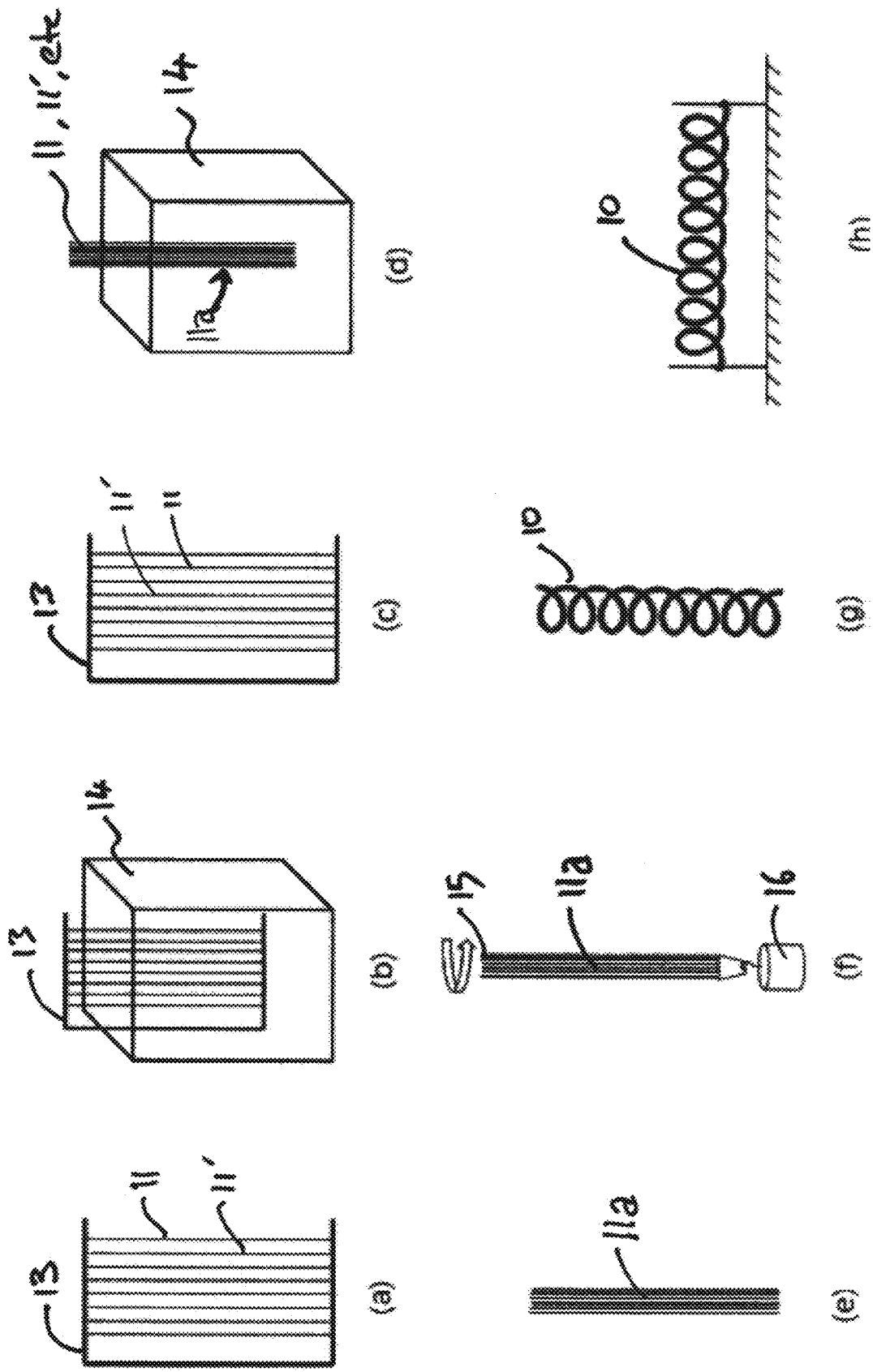
FIG. 6 illustrates steps (a) through (h) of producing the twisted and coiled bundle of filaments or fibers of FIG. 4.

In a preferred embodiment of the invention the matrix material is applied to the composite fibers by multi-stage coating to build up layers of the matrix material on the yarns, and to consolidate the preferred plurality of yarns together. Coating of the fibers may be by any of a number of known methods, such as by dip-coating, die-coating, direct roll coating where coating liquid is rolled onto the fibers by a roller suspended in the coating solution, or any other known method that facilitates an even covering to the yarn. Other methods involve a Pad-Dry-Cure method where the fibers are submerged in the coating solution then the excess squeezed out in the rollers. Other possible methods of coating the fibers include calendar finishing, hot melt extrusion coating and foam finishing. Referring to FIG. 6(a) firstly, individual filament or staple fibers are individually coated. The preferred method of coating the individual filament or staple fibers 11 is to apply the individual fibers n between the parallel arms of a C-shaped frame 13. As illustrated in FIG. 6(b) the frames and fibers are then dipped into a vessel 14 containing a matrix coating solution. In the preferred example, the matrix coating solution is a mixture of poly(dimethylsiloxane) (PDMS) and ethyl acetate (EA), with a ratio of 1:1 to 1:9 (PDMS:EA). The preferred ratio is 1:4 (PDMS:EA). The individual fibers are then dried on the frame in a drying oven to vulcanize the first layer of matrix coating on the individual fibers (FIG. 6(c)). The temperature range for oven drying is 80~120° C., for a time range of between 1 hour and 6 hours. An optimally 80° C. for 3 hours. The individual coated filament or staple fibers 11,11' etc are then combined into a multi-fiber yarn, as afore mentioned, and then dipped into the vessel 14 containing the coating solution (FIG. 6(d)) to coat the combine fibers in the matrix. The multi-stage coating disperses and consolidates the individual fibers in the matrix. The individually coated fibers 11, 11' etc. coating separately as shown in the cross section illustration of FIG. 2. The multi-fiber yarn 11a is then dried in a drying oven to vulcanize the final matrix coating (FIG. 6(e)). The temperature range for oven drying is again 80 to 120° C., for a time range of between 1 hour and 6 hours. An optimally 80° C. for 3 hours.

Referring to FIG. 6(f), the coated multi-fiber yarn 11a is then preferably twisted by fixing the yarn at a first end 15, and loading the yarn by suspending a weight 16 from a second end of the yarn. One end of the loaded yarn 11a is then turned to twist the yarn. Referring to FIG. 6(g), the twisted yarn is then coiled by any various known techniques but a preferred method includes coiling the single yarn against a tool by either further twisting (homochirality) or heat setting prior to twisting in the opposite direction (heterochirality). Finally, as illustrated in FIG. 6(h) the coiled yarn is then heat set in a curing oven at temperature for a period of time. Preferably the matrix is heat set at 220 deg-C for one (1) hour.

The MAMFCY according to the invention exhibits anisotropy or directional dimensional expansion/contraction of the composite yarns due to coupled mechanical deformation. The result is a composite fiber linear actuator that exhibits excellent performance, as well as flexibility, adjustability in actuating force and stroke, long lasting and outstanding environmental stability.

The actuation is triggered by volume changes due to temperature/humidity changes and can be powered by, for example, hydrothermal, electro-thermal, photo-thermal, hygral or chemical stimulation. The MAMFCY can be designed to work under different conditions with sufficient force and actuating stroke by choice of the relative expansion coefficients of the yarn and matrix material.

In yet a further example of the invention, a final coating biocompatible component (e.g. silicone) could be applied if the actuator need to be implanted to the body of living beings as an artificial muscle. Alternatively, polyimide yarn could be chosen to meet the requirement of thermal stability when the actuator is used under high-temperature condition for waste heat recovery in industrial process.

The invention claimed is:

1. A multi-level-architecture multi-fiber composite yarn, comprising:
    a composite yarn having a first anisotropic expansion coefficient in an axial and/or radial direction, and
    a matrix material included with the composite yarn,
    wherein the matrix material has a second anisotropic expansion coefficient that is different from the first anisotropic expansion coefficient in at least one of the axial or radial directions;
    wherein the composite yarn comprises multiple continuous filament or staple fibers dispersed in the matrix material to form a single yarn.

2. The multi-level-architecture multi-fiber composite yarn of claim 1 wherein the continuous filament or staple fibers are made from material selected from a group consisting of polyimide, polyester, polyethylene, polyamide, aliphatic polyesters, polylactic acid, poly(3-hydroxybutyrate-co-3-hydroxyvalerate), metal, ceramic, and wool.

3. The multi-level-architecture multi-fiber composite yarn of claim 1 wherein the continuous filament or staple fibers are polyamide fibers.

4. The multi-level-architecture multi-fiber composite yarn of claim 1 wherein the continuous filaments or staple fibers are individually coated in the matrix material, prior to being combined in the matrix material.

5. The multi-level-architecture multi-fiber composite yarn of claim 4 wherein the individually coated filaments or fibers are combined by bundling the filaments or fibers to form bundled filaments or fibers and dipping the bundled filaments or fibers in a solution of the matrix material, and then dried to vulcanize the matrix material.

6. The multi-level-architecture multi-fiber composite yarn of claim 1 wherein the matrix material is selected from a group consisting of poly(dimethylsiloxane), dimethicone, thermal plastic elastomeric olefin, polyurethane, ethoxyline, natural or synthetic rubber, mineral, and responsive gel.

7. The multi-level-architecture multi-fiber composite yarn of claim 6 wherein the matrix material is poly(dimethylsiloxane).

8. The multi-level-architecture multi-fiber composite yarn of claim 1 wherein the first anisotropic expansion coefficient and/or the second anisotropic expansion coefficient is responsive to hydrothermal, electro-thermal, photo-thermal, hygral, chemical stimulation.

9. The multi-level-architecture multi-fiber composite yarn of claim 1 wherein the composite yarn comprises two more individually coated composite yarns included together by one of twisting, winding, plying, cabling, or braiding to form included composite yarns and then curing the included composite yarns.

10. A method of fabricating a multi-level-architecture multi-fiber composite yarn, comprising infiltrating a composite yarn having a first anisotropic expansion coefficient in an axial and/or radial directions with a matrix material having a second anisotropic expansion coefficient different from the first anisotropic expansion coefficient in the axial or radial direction;
    wherein the composite yarn comprises multiple continuous filament or staple fibers combined in the matrix material; and
    wherein the continuous filaments or staple fibers are individually coated in the matrix material, prior to being combined in the matrix material.

11. The method of claim 10 wherein individually coating the continuous filaments or staple fibers comprises:
    dipping the individual filaments or fibers in a solution of the matrix material to form a coating on respective individual filaments or fibers, and
    drying the individual filaments or fibers in a drying oven to vulcanize the coating.

12. The method of claim 11 further comprising
    bundling the individually coated filaments or fibers, and
    further dipping the bundled filaments or fibers into the solution of the matrix material to coat the bundled filaments or fibers, and
    drying the bundled filaments or fibers in a drying oven to vulcanize the coating.

13. The method of claim 12 further comprising:
    loading the coated bundle of filaments or fibers, and
    twisting the coated bundle of filaments or fibers.

14. The method of claim 13 further comprising:
    coiling the twisted bundle against a tool by either further twisting, or heat setting prior to twisting in an opposite direction, or winding against a tool, and curing the coiled bundle in a curing oven.

15. The method of claim 14 wherein the curing in the curing oven comprising heating the coiled bundle to 220 deg-C for one hour.

16. The method of claim 10 further comprising selecting a material of the continuous filaments or staple fibers from a group consisting of polyimide, polyester, polyethylene, polyamide, aliphatic polyesters, polylactic acid, poly(3-hydroxybutyrate-co-3-hydroxyvalerate), metal, ceramic, and wool.

17. The method of claim 16 wherein the selecting comprises selecting polyamide fibers.

18. The method of claim 10 further comprising selecting the matrix material from a group consisting of poly(dimethylsiloxane), dimethicone, thermal plastic elastomeric olefin, polyurethane, ethoxyline, natural or synthetic rubber, mineral, and responsive gel.

19. The method of claim 18 wherein the selecting comprises selecting poly(dimethylsiloxane).

20. A multi-fiber composite yarn produced by the method according to the steps of claim 10.

21. A multi-level-architecture multi-fiber composite yarn, comprising:
a composite yarn having a first anisotropic expansion coefficient in an axial and/or radial direction, and
a matrix material included with the composite yarn,
wherein the matrix material has a second anisotropic expansion coefficient that is different from the first anisotropic expansion coefficient in at least one of the axial or radial directions;
wherein the matrix material is selected from a group consisting of poly(dimethylsiloxane), dimethicone, thermal plastic elastomeric olefin, polyurethane, ethoxyline, natural or synthetic rubber, mineral, and responsive gel.

22. A multi-level-architecture multi-fiber composite yarn, comprising:
a composite yarn having a first anisotropic expansion coefficient in an axial and/or radial direction, and
a matrix material included with the composite yarn,
wherein the matrix material has a second anisotropic expansion coefficient that is different from the first anisotropic expansion coefficient in at least one of the axial or radial directions;
wherein the composite yarn comprises two more individually coated composite yarns included together by one of twisting, winding, plying, cabling, or braiding to form included composite yarns, and then curing the included composite yarns.

23. A method of fabricating a multi-level-architecture multi-fiber composite yarn, comprising infiltrating a composite yarn having a first anisotropic expansion coefficient in an axial and/or radial directions with a matrix material having a second anisotropic expansion coefficient different from the first anisotropic expansion coefficient in the axial or radial direction;
wherein the method further comprises selecting the matrix material from a group consisting of poly(dimethylsiloxane), dimethicone, thermal plastic elastomeric olefin, polyurethane, ethoxyline, natural or synthetic rubber, mineral, and responsive gel.

* * * * *